United States Patent
Smithpeter et al.

(10) Patent No.: US 7,274,815 B1
(45) Date of Patent: Sep. 25, 2007

(54) PARALLEL PHASE-SENSITIVE THREE-DIMENSIONAL IMAGING CAMERA

(75) Inventors: Colin L. Smithpeter, Albuquerque, NM (US); Eddie R. Hoover, Sandia Park, NM (US); Bedabrata Pain, Los Angeles, CA (US); Bruce R. Hancock, Altadena, CA (US); Robert O. Nellums, Albuquerque, NM (US)

(73) Assignees: Sandia Corporation, Albuquerque, NM (US); California Institute of Technology, Pasadena, CA (US)

( * ) Notice: Subject to any disclaimer, the term of this patent is extended or adjusted under 35 U.S.C. 154(b) by 870 days.

(21) Appl. No.: 10/681,961

(22) Filed: Oct. 9, 2003

(51) Int. Cl.
*G06K 9/00* (2006.01)
(52) U.S. Cl. .................................. 382/154
(58) Field of Classification Search ........... 382/154, 382/210, 211; 356/4.01, 5.1, 12; 345/419–420
See application file for complete search history.

(56) References Cited

U.S. PATENT DOCUMENTS

| | | | |
|---|---|---|---|
| 4,935,616 A | 6/1990 | Scott | |
| 5,513,021 A * | 4/1996 | Kaneshiro et al. | 359/15 |
| 6,088,086 A | 7/2000 | Muguira et al. | |
| 6,323,942 B1 | 11/2001 | Bamji | |
| 6,373,557 B1 | 4/2002 | Mengel | |
| 6,392,747 B1 | 5/2002 | Allen | |
| 6,512,838 B1 | 1/2003 | Rafii | |
| 6,515,740 B2 | 2/2003 | Bamji | |
| 6,522,395 B1 | 2/2003 | Bamji | |
| 6,522,396 B1 | 2/2003 | Halmos | |
| 6,580,496 B2 | 6/2003 | Bamji | |
| 6,587,186 B2 | 7/2003 | Bamji | |
| 6,822,687 B1 * | 11/2004 | Kakiuchi et al. | 348/348 |
| 7,026,602 B2 * | 4/2006 | Dausch | 250/226 |

OTHER PUBLICATIONS

R.L. Schmitt, et al "High-Frequency Scannerless Imaging Laser Radar for Industrial Inspection and Measurement Applications," Sandia Report No. SAND96-2739, Nov. 1996.

R. L. Lange, et al "Time-of-Flight range imaging with a custom solid-state image sensor," Proceedings of the SPIE, vol. 3823, pp. 180-191, 1999.

(Continued)

*Primary Examiner*—Daniel Mariam
(74) *Attorney, Agent, or Firm*—John P. Hohimer

(57) ABSTRACT

An apparatus is disclosed for generating a three-dimensional (3-D) image of a scene illuminated by a pulsed light source (e.g. a laser or light-emitting diode). The apparatus, referred to as a phase-sensitive 3-D imaging camera utilizes a two-dimensional (2-D) array of photodetectors to receive light that is reflected or scattered from the scene and processes an electrical output signal from each photodetector in the 2-D array in parallel using multiple modulators, each having inputs of the photodetector output signal and a reference signal, with the reference signal provided to each modulator having a different phase delay. The output from each modulator is provided to a computational unit which can be used to generate intensity and range information for use in generating a 3-D image of the scene. The 3-D camera is capable of generating a 3-D image using a single pulse of light, or alternately can be used to generate subsequent 3-D images with each additional pulse of light.

26 Claims, 4 Drawing Sheets

OTHER PUBLICATIONS

K. R. Spring, et al, "Electronic Imaging Detectors," http://micro.magnet.fsu.edu/primer/digitalimaging/digitalimagingdetectors.html.

K. R. Spring, et al, "Electronic Imaging Detectors," http://micro.magnet.fsu.edu/primer/digitalimaging/digitalimagingdetectors.html, pp. 1-16, Oct. 7, 2003.

* cited by examiner

PARALLEL PHASE-SENSITIVE THREE-DIMENSIONAL IMAGING CAMERA

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to an apparatus and method for quantitative three-dimensional (3-D) imaging of a scene, and in particular to an apparatus and method capable of simultaneously determining intensity (i.e. appearance) and range information to construct a 3-D image of a scene after illuminating the scene with pulsed or modulated light.

BACKGROUND OF THE INVENTION

Three-dimensional (3-D) imaging is needed for many applications including robotic vision, inspection, navigation, collision avoidance, target recognition and aimpoint refinement for munitions. Conventional 3-D imaging, which utilizes a scanned laser source and a detector that measures return signals pixel by pixel, is too slow for many of the above applications. To increase the speed of data collection, scannerless range imaging (SRI) has been introduced to illuminate a scene of interest all at once using multiple illumination pulses or continuous modulation of the illumination, and then to collect the data wherefrom a 3-D image can be constructed in a parallel fashion (see e.g. U.S. Pat. Nos. 4,935,616 and 6,088,086 which are incorporated herein by reference). As it is currently practiced, SRI requires a minimum of three illumination pulses to obtain sufficient information to construct a 3-D image. For many of the above applications, especially when the scene of interest is rapidly changing over time or when the SRI system is moving, the range information for the 3-D image can be distorted requiring the use of signal correction techniques.

What is needed is a 3-D imaging system that is capable of producing a 3-D image of a scene of interest using a single pulse of light, and which can acquire subsequent 3-D images of the scene with each additional pulse of light. Such a 3-D imaging system would largely eliminate any image distortion due to movement since the movement will generally be very small over the time scale of the single pulse of light which can be subnanosecond or up to a few tens of nanoseconds. Additionally, such a 3-D imaging system should be adaptable in certain embodiments for continuous imaging (e.g. by using a repetitively pulsed or modulated light source).

The present invention provides a solution to 3-D imaging using a single pulse of light by providing a two-dimensional (2-D) array of photodetectors with associated circuitry that operates to process a detected light signal from each photodetector in parallel by sharing the detected light signal between multiple components which can simultaneously process the detected light signal to generate intensity and range information for each photodetector that can then be used to construct a 3-D image of a scene. The use of parallel information processing according to the present invention represents an advance over the prior art by reducing the number of required pulses from the light source to a single pulse at a minimum, thereby allowing essentially instantaneous 3-D imaging (also termed flash ladar imaging). The present invention can further be used with a modulated light source to provide continuous imaging at a video rate.

These and other advantages of the present invention will become evident to those skilled in the art.

SUMMARY OF THE INVENTION

The present invention relates to an apparatus for generating a three-dimensional (3-D) image of a scene of interest illuminated by a pulsed or modulated light source. The apparatus, which is also termed herein a parallel phase-sensitive 3-D imaging camera, comprises a two-dimensional (2-D) array of photodetectors for receiving reflected or scattered light from the scene illuminated by the light source with the light being imaged onto the 2-D array of photodetectors, and with each photodetector in the 2-D array generating therefrom an electrical output signal; a plurality of modulators associated with each photodetector in the 2-D array, with each modulator receiving the electrical output signal from that photodetector and an alternating current (ac) reference signal with a different phase delay for each modulator, and with each modulator generating a modulated output signal for that photodetector; a plurality of integrators associated with each photodetector, with each integrator receiving the modulated output signal from one of the plurality of modulators, and generating therefrom a steady-state integrator output signal for each integrator associated with that photodetector; and a computational unit receiving each integrator output signal associated with each photodetector and generating therefrom intensity and range information about the scene illuminated by the light source to generate the 3-D image of the scene of interest. The electrical output signal produced by each photodetector can further be filtered or amplified or both, as needed, prior to being provided to each modulator associated with that photodetector.

The apparatus, which can generate a complete 3-D image of the scene in a single pulse of light from a light source such as a laser, also preferably includes an optical element (e.g. a lens or imaging mirror) located proximate to the 2-D array of photodetectors to image the reflected or scattered light thereon.

In certain embodiments of the present invention, the 2-D array of photodetectors and the plurality of modulators and other signal processing circuitry can be located on a common substrate (e.g. when the photodetectors and circuitry both comprise silicon). In other embodiments of the present invention, the 2-D array of photodetectors can be located on a first substrate, and the plurality of modulators and other signal processing circuitry including the integrators and computational unit can be located on a second substrate. In these embodiments, the first and second substrates can be superposed one above the other and electrically connected together (e.g. using a plurality of solder bump bonds).

By locating the photodetectors on a separate substrate from the signal processing circuitry, the apparatus of the present invention can be adapted for use over different wavelength ranges by providing a 2-D array of photodetectors which comprises either silicon photodetectors (useful in the visible and up to about 1100 nanometers wavelength), or indium gallium arsenide (InGaAs) photodetectors (useful in the 1-1.7 µm wavelength range), or mercury cadmium telluride (HgCdTe) photodetectors (useful in the 3-5 µm wavelength range). The signal processing circuitry can comprise, for example, complementary metal-oxide-semiconductor (CMOS) circuitry or Bi-CMOS circuitry.

In the apparatus, the phase delay for each modulator associated with a particular photodetector can be substantially equal to an integer fraction (i.e. 0, 1/n, 2/n, 3/n . . . (n−1)/n where n is an integer equal to the number of modulators associated with each photodetector) of a period of the ac reference signal. Thus, the phase delay for one of the plurality of modulators associated with each photodetector will generally be zero (0) degrees, and the phase delay for the remainder of the plurality of modulators associated with that photodetector will be an integer multiple of 360/n degrees where n is a total number of modulators associated with that photodetector. Those skilled in the art will understand that a phase delay of 0 degrees is equivalent to a phase delay of 360 degrees.

In certain embodiments of the apparatus of the present invention, the plurality of integrators associated with each photodetector in the 2-D array comprises three integrators. In these embodiments of the present invention, the phase delay for a first integrator of the three integrators is 0 degrees, the phase delay for a second integrator of the three integrators is 120 degrees, and the phase delay for a third integrator of the three integrators is 240 degrees.

The present invention further relates to a method for generating a three-dimensional (3-D) image information from a scene of interest illuminated by a light source, comprising steps for detecting reflected or scattered light from the scene illuminated by the light source with a two-dimensional (2-D) array of photodetectors and generating an electrical output signal from each photodetector; simultaneously modulating the electrical output signal from each photodetector by a plurality of modulators operating at the same reference frequency, but with a different phase delay for each modulator, and thereby generating a plurality of modulated output signals for each photodetector; and separately integrating each of the plurality of modulated output signals for each photodetector and producing therefrom a plurality of integrator output signals wherefrom intensity and range information for each photodetector can be determined. The method of the present invention can further comprise a step for imaging the reflected or scattered light from the scene onto the 2-D array of photodetectors using an optical element such as a lens or mirror.

The step for detecting the reflected or scattered light from the scene can comprise detecting the reflected or scattered light from a single pulse of light from a pulsed light source (e.g. a laser or a pulsed light-emitting diode). The step for generating the electrical output signal from each photodetector can comprise transforming a photocurrent signal generated by the photodetector in response to detected light into a voltage signal. Additionally, the step for generating the electrical output signal from each photodetector can further comprise amplifying or filtering the photocurrent signal or the voltage signal. The phase delay for each modulator can comprise an integer fraction of a period of the reference frequency as previously defined herein.

The present invention also relates to a three-dimensional (3-D) imaging camera for generating a 3-D image of a scene illuminated by a single pulse of light from a source, comprising a two-dimensional (2-D) array of photodetectors, with each photodetector in the array receiving reflected or scattered light from the illuminated scene and generating therefrom a photodetector output signal; at least two modulators receiving the photodetector output signal from each photodetector and generating a modulator output signal which is a product of the photodetector output signal and an alternating current (ac) reference signal, with the ac reference signal for each modulator having the same frequency and a different phase delay; an integrator connected to receive the modulator output signal from each modulator and to generate therefrom an integrator output signal by integrating the modulator output signal over time; and a computational unit for receiving each integrator output signal and generating therefrom the 3-D image of the scene.

In the 3-D imaging camera, the light source can comprise a laser, or alternately a light-emitting diode (LED). The 3-D imaging camera can further comprise an optical element (e.g. a lens or mirror) for imaging the reflected or scattered light from the illuminated scene onto the 2-D array of photodetectors.

The phase delay for one of the modulators in the 3-D imaging camera can be zero (0) degrees; and the phase delay for the remaining modulators can be equal to an integer multiple of 360/n degrees where n is a total number of the modulators associated with each photodetector.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
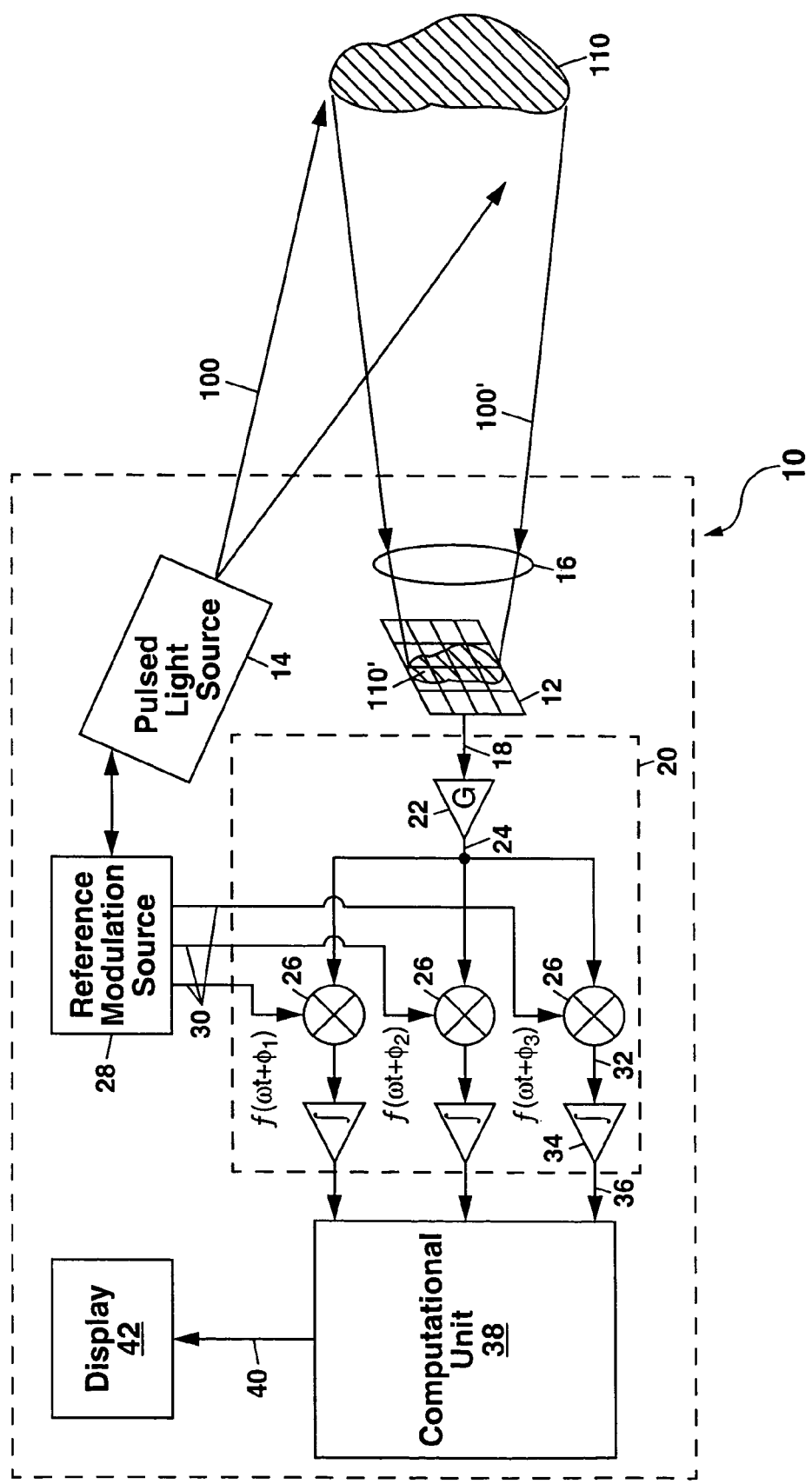
FIG. 1 shows a schematic diagram of an embodiment of the apparatus of the present invention.

Referring to FIG. 1, there is shown a schematic diagram of an embodiment of the apparatus 10 of the present invention. In FIG. 1, the apparatus 10 comprises a two-dimensional (2-D) array of photodetectors 12, for receiving light 100' reflected or scattered from a scene of interest 110 in response to illumination of the scene 110 by one or more pulses of light 100 emanating from a pulsed light source 14 (e.g. a laser such as a Q-switched solid-state laser or a semiconductor diode laser, or a light-emitting diode). Each pulse of light 100 generally has a time duration of a few nanoseconds to a few tens of nanoseconds, with the exact time duration depending upon a desired range resolution for the apparatus 10. The pulsed light source 14 can optionally include one or more lenses to control a solid angle of the emitted beam for each pulse of light 100.

In FIG. 1, the emitted beam of light 100 is reflected or scattered from the scene of interest 110 thereby producing reflected or scattered light 100' which can then be imaged onto the 2-D array of photodetectors 12 with an optical element 16. In FIG. 1, the optical element 16 is schematically illustrated as a lens, although those skilled in the art will understand that the optical element 16 can comprise a plurality of lenses or alternately one or more mirrors (e.g. a pair of curved mirrors arranged to form a telescope). The reflected or scattered light 100' is imaged onto the 2-D array of photodetectors 12 to produce an image 110' of the scene 110, with the individual photodetectors 12 generating a photocurrent signal 18 in response to the light 100' received. In FIG. 1, signal processing circuitry associated with a single photodetector 12 of the 2-D array is shown. This signal processing circuitry 20, which is replicated for each photodetector 12 in the 2-D array, can be formed using analog complementary metal-oxide-semiconductor (CMOS) or Bi-CMOS circuitry formed on a silicon or silicon-on-insulator substrate.

In FIG. 1, the photocurrent signal 18 from each photodetector 12 can be fed into an amplifier 22 to increase the signal strength thereof and to transform the photocurrent signal 18 into an electrical output signal 24 that can then be divided and simultaneously fed into a plurality of modulators 26. The amplifier 22 can have a gain of, for example, 10-20 dB or more. The photocurrent signal 18 from each photodetector 12, which comprises one or more pulses with an overall time duration corresponding to a depth of range of the scene 110 wherefrom the light 100 is reflected or scattered, can be ac-coupled into the amplifier 22 through an in-line capacitor, or alternately the amplifier 22 can comprise an alternating-current (ac) amplifier. This is useful for removing any direct-current (dc) component from the photocurrent signal 18 due to ambient background illumination or biasing of the photodetector 12. Additionally, an optical filter (not shown) can be used to limit the wavelengths of the light 100' being detected to a relatively narrow range of wavelengths centered about that of the pulsed light source 14 to reduce the amount of detected ambient background illumination. In other embodiments of the present invention, a direct-current (dc) amplifier can be substituted for the ac amplifier in order to allow a 2-D ambient light imaging in addition to the 3-D imaging. In some embodiments of the present invention, gating of the signal processing circuitry 20 (e.g. each modulator 26) or the photodetectors 12 or both can be used to reduce the amount of detected background illumination.

In FIG. 1, a plurality of modulators 26 are associated with each photodetector 12 to generate signal components which can be used as described hereinafter to determine an exact phase relationship of the photodetector output signal 24 to the illumination pulse of light 100 which is needed to determine a range (i.e. distance) to a portion of the scene 110 responsible for reflecting or scattering the light 100' sensed by that photodetector 12. To accomplish this, a reference modulation source 28 is provided in the apparatus 10 and synchronized to the pulse of light 100 from the source 14. The reference modulation source 28 can either trigger the output of a pulse of light from the pulsed light source 14, or can be triggered by the output of the pulse of light from the source 14. What is important is that the reference modulation source 28 is synchronized to the pulsed light source 14 since the reference modulation source 28 provides a basis for determining range information for the detected light 100'.

As shown in FIG. 1, the reference modulation source 28 provides an alternating-current (ac) reference signal 30 which is given by a periodic function $f(\omega t+\phi_n)$ with $\omega=2\pi f_m$ where $f_m$ is the frequency of modulation expressed in Hertz, and with a phase delay, $\phi_n$, which is different for each of n modulators 26 in the apparatus 10 of the present invention. The ac reference signal 30 can comprise, for example, a sinusoidal or square-wave signal, which can be offset vertically (by adding a constant amplitude thereto) or linearized or both, with the ac reference signal 30 having a frequency, $f_m$, of up to a few tens of MHz or more (e.g. 5-150 MHz), and with the exact frequency, $f_m$, depending upon a desired range resolution for the apparatus 10. Additionally, a time-gating function can be applied to the modulators 26, when needed, to limit a time extent of the electrical output signal 24 and thereby convert a relative range measured by calculating a phase shift for the detected light 100' into an absolute range. Alternately, a relatively low (e.g. ≦1 MHz) frequency, $f_m$, can be used with a first pulse from the pulsed light source 14 to provide an initial estimate of the range to the scene of interest 110. The frequency, $f_m$, can then be increased for one or more successive pulses of light 100 to accurately determine the range for the reflected or scattered light 100' received by each photodetector 12.

For the embodiment of the apparatus 10 in FIG. 1 having three modulators 26 for each photodetector 12, the phase delay $\phi_n$ can be incremented by 120° for each channel (i.e. $\phi_1=0°$, $\phi_2=120°$ and $\phi_3=240°$). For other embodiments of the apparatus 10 having four modulators 26 to provide an oversampled phase measurement to determine the range for the light 100' received by each photodetector 12, the phase delay $\phi_n$ can be incremented by 90° for each channel (i.e. $\phi_1=0°$, $\phi_2=90°$, $\phi_3=180°$ and $\phi_4=270°$). In general, the phase delay, $\phi_n$, for each modulator 26 associated with a particular photodetector 12 can comprise an integer fraction of a period of the ac reference signal 30 (e.g. 0°, 360°/n, 2(360°/n) . . . (n−1)(360°/n) where n is the number of modulators 26 associated with each photodetector 12).

In FIG. 1, a modulated output signal 32 from each modulator 26 can be integrated over time using an integrator 34 which comprises a capacitor. Each integrator 34 produces an integrator output signal 36 that can then be digitized using an analog-to-digital (A/D) converter within a computational unit 38 (i.e. a computer or on-chip computer circuitry) with the digitized integrator output signals 36 associated with each photodetector 12 then being fitted to a Fourier decomposition equation of the form $A_1+A_2 f(\omega t+\phi)$ to calculate values for $A_1$ which is due to variances in ambient light received by each photodetector 12, $A_2$ is representative of the intensity of the light 100' received by each photodetector 12 including variances in reflectivity or scattering of the scene 110 (i.e. albedo), and a phase shift $\phi$ for the light 100' received by each photodetector 12 which is due to a propagation delay of the pulse of light 100 originally sent out from the pulsed light source 14 and the reflected or scattered light 100' subsequently received by the photodetector 12.

By generating three integrator output signals 36 for each photodetector 12, the three variables $A_1$, $A_2$ and $\phi$ in the above equation can be determined using the computational unit 38. This generally involves a least-squares fitting of the integrator output signals 36 to the above equation using algorithms similar to those previously used for SRI. Examples such algorithms can be found in U.S. Pat. No. 6,088,086 and in a report by R. L. Schmitt et al. entitled

*High Frequency Scannerless Imaging Laser Radar for Industrial Inspection and Measurement Applications* (Sandia Report No. SAND96-2739, Nov. 1996) and in an article by R. Lange et al. entitled *Time-of-Flight Range Imaging With a Custom Solid-State Image Sensor* (SPIE Vol. 3823, pp. 180-190, 1999), which are incorporated herein by reference.

The range, R, measured from the photodetector 12 to a portion of the scene 110 producing the reflected or scattered light 100' received by that photodetector 12 can then be found from a range equation:

$$R = \frac{c\phi}{4\pi f_m}$$

where c is the speed of light, $\phi$ is the relative phase shift determined from the computational unit 38, and $f_m$ is the frequency of the reference modulation from the source 28.

Since the relative phase shift as determined from the integrator output signals 36 is a periodic function (with period $2\pi$), a low initial frequency, $f_m$, can be used for an initial measurement of the range to the scene of interest 110, and one or more successive pulses of light 100 can be utilized to refine the range accuracy as needed depending upon the exact value of the range. Alternately, the time-gating function can be used to gate the modulators 26 to provide an accurate range determination when the expected range exceeds a value given by:

$$R \geq \frac{c}{2f_m}$$

The above approaches allow the relative phase shift $\phi$ to be determined within a specific period $2\pi$ so that an absolute phase shift can be determined in order to precisely determine the range for the light 100' received by each photodetector 12.

The computational unit 38, which preferably comprises digital CMOS or Bi-CMOS circuitry formed on a silicon or silicon-on-insulator substrate, utilizes the various integrator output signals 36 for each photodetector 12 to fit these signals 36 to a phase-shifted curve of the ac reference signal 30 (i.e. $A_1+A_2 f(\omega t+\phi)$), over the range of $0-2\pi$ and thereby determine the intensities $A_1$ and $A_2$ and the relative phase shift $\phi$ for the light 100' detected by that photodetector 12. The relative phase shift $\phi$ is then used to calculate the range, R, to a portion of the scene 110 wherefrom the light 100' originated. This can be done digitally in the computational unit 38 for each photodetector 12 in the 2-D array that receives sufficient light 100' to generate the requisite integrator output signals 36. The computational unit 38 can then store this intensity and range information in memory and can further provide an output signal 40 to a display 42 at a video rate to form a 3-D image of the scene of interest 110. The computational unit 38 can also reset each integrator 34, as needed, to prepare for the acquisition of a subsequent 3-D image. The intensity and range information can also be used for other specific purposes including, for example, directing the motion of a robot or vehicle, sounding an alert of a possible collision and changing course to avert such a collision, identifying an object and its orientation by comparing the 3-D image or features therefrom to a reference image or features stored in memory, etc. By determining the intensity and range information from a single pulse of light, any distortion due to motion of the apparatus 10 or the scene of interest 110 is effectively eliminated.

Those skilled in the art will understand that the intensity and range information generated by the apparatus 10 can be presented in different ways. For example, intensity information (determined from the presence or absence of a signal 18 from each photodetector 12) can be used to generate an image of the scene 110, with each point in the scene 110 being located on a three-dimensional coordinate system. As another example, the display 42 can present an image of the scene 110 on a two-dimensional coordinate system with the range information being used to control the intensity of portions of the image of the scene 110 to indicate the range for these portions (e.g. closer portions of the image can be presented with a higher intensity in the display 42, and more distant portions of the image can be presented with a lower intensity).

It should be noted that the above analysis assumes that there is relatively little or no propagation delay within the photodetector 12 and the signal processing circuitry 20. When this is not the case, the propagation delay can be taken into account by the computational unit 38, for example, by calibrating the apparatus 10 with a target at a known distance and storing appropriate correction factors in memory for use in correcting the range information as needed.

Figure 2:
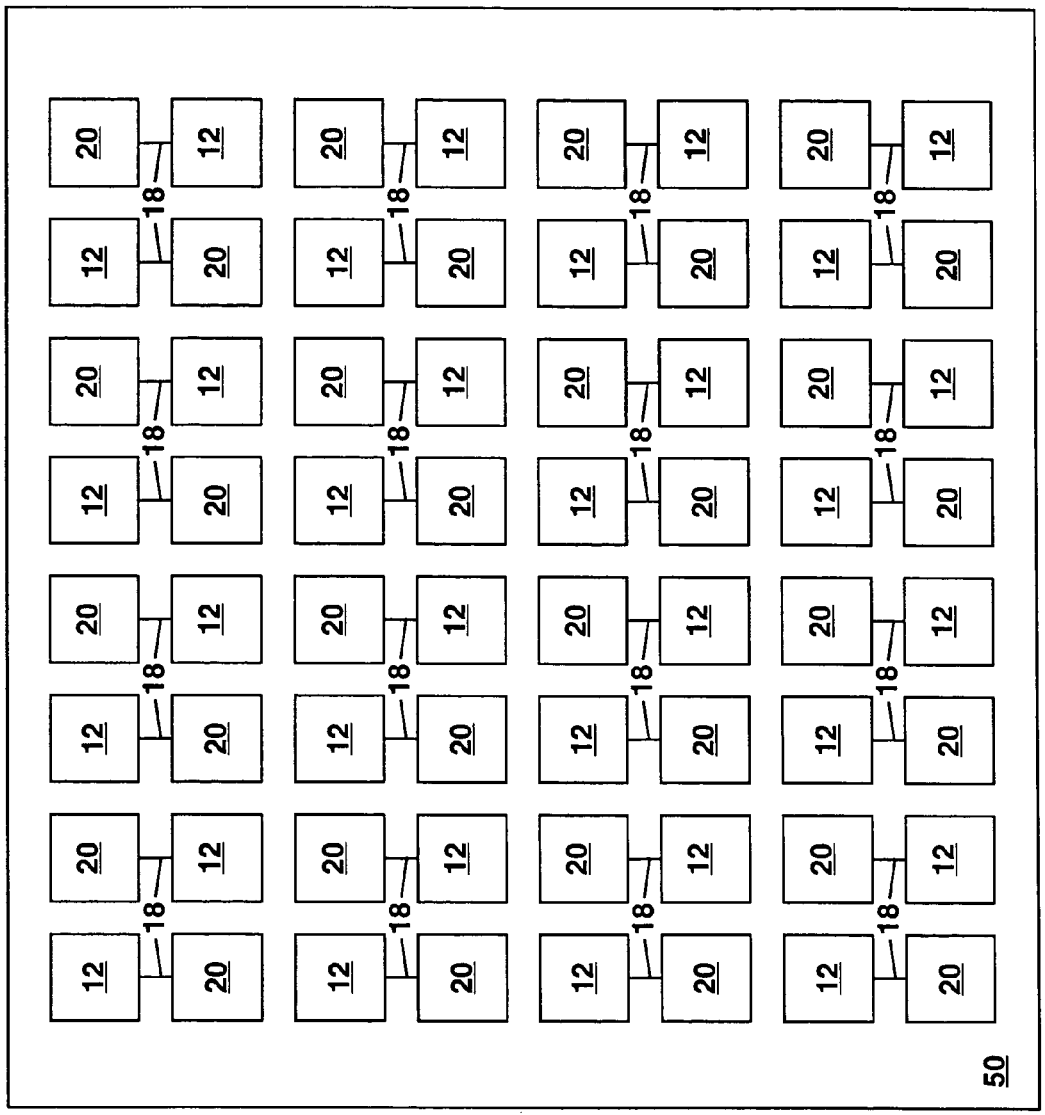
FIG. 2 shows an example of the embodiment of the apparatus in FIG. 1 formed on a common substrate with the signal processing circuitry associated with each photodetector being located proximate to that photodetector.

The 2-D array of photodetectors 12 can be formed together with the signal processing circuitry 20 on a common substrate 50 according to certain embodiments of the present invention. This is particularly useful when the photodetectors 12 comprise silicon photodetectors 12 which operate at visible wavelengths and in the near-infrared up to about 1.1 μm, with the substrate 50 also comprising a silicon or silicon-on-insulator substrate. A common substrate 50 can also be used for fabricating the apparatus 10 from III-V compound semiconductors (e.g. GaAs, InGaAs or InP) for operation of the apparatus in other wavelength ranges in the visible or near-infrared. FIG. 2 schematically illustrates an example of such an arrangement with the signal processing circuitry 20 associated with each photodetector 12 being located adjacent to that photodetector 12. In FIG. 2, the 2-D array of photodetectors 12 is shown as a 4×4 array for ease of illustration. In an actual device 10, the 2-D array will generally comprise up to tens of thousands or more individual photodetectors 12.

In the example of FIG. 2, the 2-D array of photodetectors 12 is staggered to provide a relatively dense 2-D array, with each photodetector 12 having lateral dimensions of, for example, 20-100 μm. In FIG. 2, other circuitry including addressing circuitry, photodetector biasing circuitry, reset circuitry, etc. has been omitted for clarity. Additionally, a plurality of bond pads, which are generally located around the periphery of the substrate 50 to provide electrical inputs and outputs to the circuitry 20 and photodetectors 12 have been omitted. Those skilled in the art will understand that other arrangements of the photodetectors 12 and signal processing circuitry 20 are possible. In some embodiments of the present invention, the signal processing circuitry 20 associated with each photodetector 12 can be superposed with that photodetector 12. Furthermore, although not shown in FIG. 2, the reference modulation source 28, the computational unit 38 including analog-to-digital (A/D) conversion circuitry and associated memory can be optionally located on the substrate 50. In FIG. 2, the signal processing circuitry 20 can comprise CMOS or Bi-CMOS circuitry with a 0.5 μm or smaller feature size.

Figure 3A:
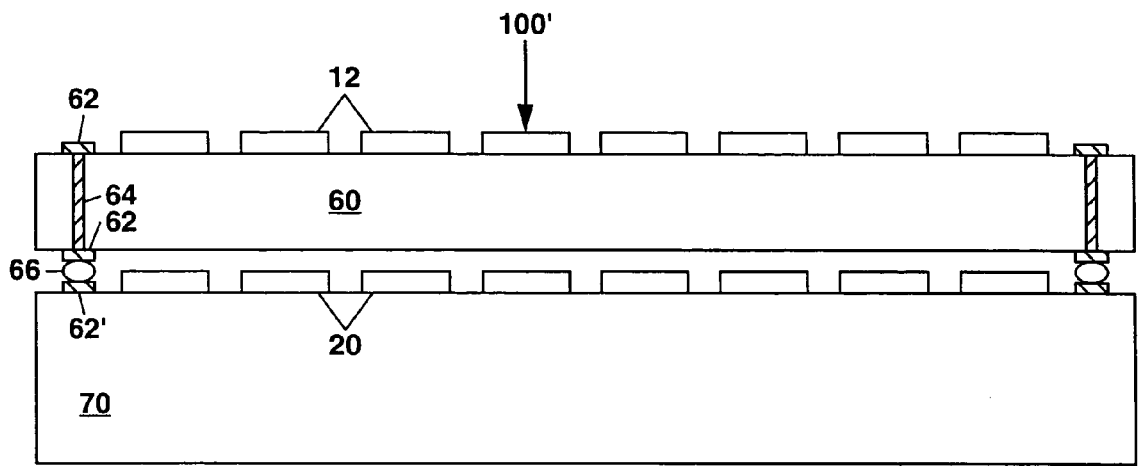
FIGS. 3A and 3B show examples of the embodiment of the apparatus of FIG. 1 with the 2-D array of photodetectors being formed on one substrate and with the signal processing circuitry being formed on another substrate.
Figure 3B:
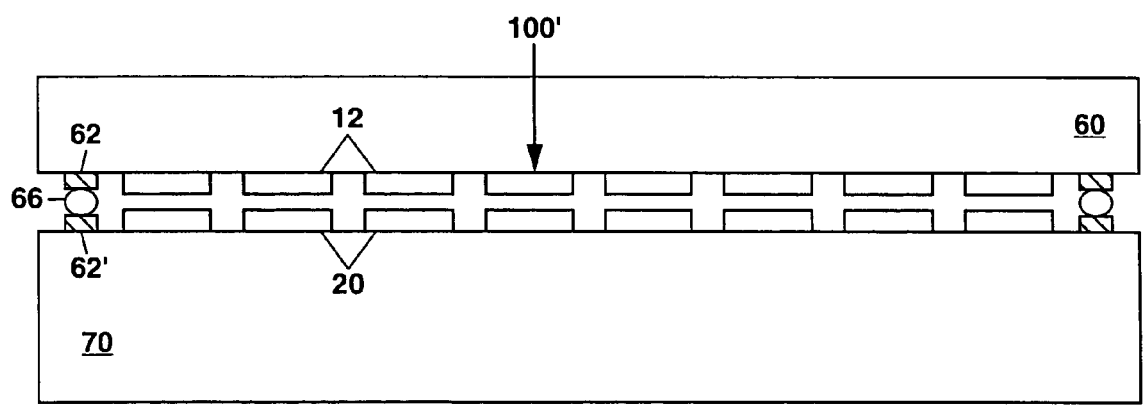

FIGS. 3A and 3B show schematic cross-section views of alternative examples of the apparatus 10 of FIG. 1 with the 2-D array of photodetectors being deposited on or formed within a first substrate 60 and with the signal processing circuitry 20 being formed on or within a second substrate 70, and with the two substrates 60 and 70 being superposed one above the other and electrically connected together. In FIG. 3A, the substrate 60 holding the photodetectors 12 is oriented with the photodetectors 12 away from the second substrate 70 with a plurality of electrical connections being formed by a patterned metallization 62 on both surfaces of the first substrate 60 and connected by vias 64 through the substrate 60. This allows the substrates 60 and 70 to be attached together and electrically interconnected by a plurality of solder bump bonds 66 which attach the metallization 62 to another patterned metallization 62' on the second substrate 70. A plurality of bond pads (not shown) can be provided around the periphery of the first substrate 60 to form external electrical connections to the substrates 60 and 70. The first substrate 60 can also be optionally thinned to facilitate formation of the vias 64 through the substrate 60. In FIG. 3B, if the substrate 60 is transmissive to the reflected or scattered light 100', then the two substrates 60 and 70 can be bonded together with the photodetectors 12 facing downwards.

These arrangements in FIGS. 3A and 3B are particularly useful when the photodetectors 12 are formed of a different material from that used to form the circuitry 20. As an example, the photodetectors 12 in FIG. 3 can comprise indium gallium arsenide (InGaAs) or mercury cadmium telluride (HgCdTe) for use at near-infrared wavelengths of 1-1.7 μm and 3-5 μm, respectively, to provide eye-safe operation of the apparatus 10, or to provide 3-D imaging through clouds, smoke, etc. The HgCdTe photodiodes can be cryogenically cooled.

Those skilled in the art will understand that other types of photodetectors 12 can be used with the apparatus 10 of the present invention to allow 3-D imaging at other wavelengths of interest. Such photodetectors 12 can be formed, for example, from II-VI or III-V semiconductor alloys. In addition, the photodetectors 12 can comprise avalanche photodiodes which are useful to provide some amplification of the reflected or scattered light 100' after detection thereof. In other embodiments of the present invention, the 2-D array of photodetectors 12 can comprise an electron-bombarded charge coupled device (CCD) as known to the art. Such an electron-bombarded CCD comprises a combination of an image intensifier having a photocathode for generating electrons in response to the received light 100' and an array of charge coupled devices (i.e. a CCD) for sensing the electrons after they have been accelerated by a high electrical potential provided between the photocathode and the charge coupled devices. The use of an electron-bombarded CCD can be advantageous for providing gain in the photodetectors 12 in addition to the amplification provided in the signal processing circuitry 20.

The above photodetectors 12 can be combined with silicon CMOS or Bi-CMOS circuitry which is preferably used for the signal processing circuitry 20 since this technology is well-developed and readily available through commercial foundries. The provision of the photodetectors 12 on one substrate 60 and the signal processing circuitry 20 on the other substrate 70 also allows each to be separately optimized and then joined together by a plurality of solder bump bonds to form a monolithic unit.

The apparatus 10 of the present invention can be used in a passive mode to form a 2-D image by providing a constant input to the modulators 26 in place of the ac reference signal 30 so that the integrator output signals 36 will all be the same and will represent the intensity of the detected light 100'. This is useful, for example, to search a relatively wide area. Once a scene of interest 110 is located (e.g. by detecting a glint in the 2-D image), the ac reference signal 30 can be switched on to form a 3-D image of the scene of interest 110. The 3-D image can be zoomed in by increasing the frequency, f, or by gating the modulators 26 as described previously.

Although apparatus 10 of the present invention has been described for use with a pulsed light source 14, a modulated light source can be substituted for the pulsed light source 14 in FIG. 1, with the modulated light source generally being driven at the frequency, f, of the reference modulation source 28, or a multiple or sub-multiple thereof. In this case, the signal processing circuitry 20 will be the same as shown in FIG. 1, with each integrator 34 providing an integrator output signal 36 that can be sampled at particular instants in time by the computational unit 38 to generate a 3-D image of the scene 110 at a predetermined rate (e.g. from a single image corresponding to one instant in time to a series of images displayed at a video rate).

Figure 4:
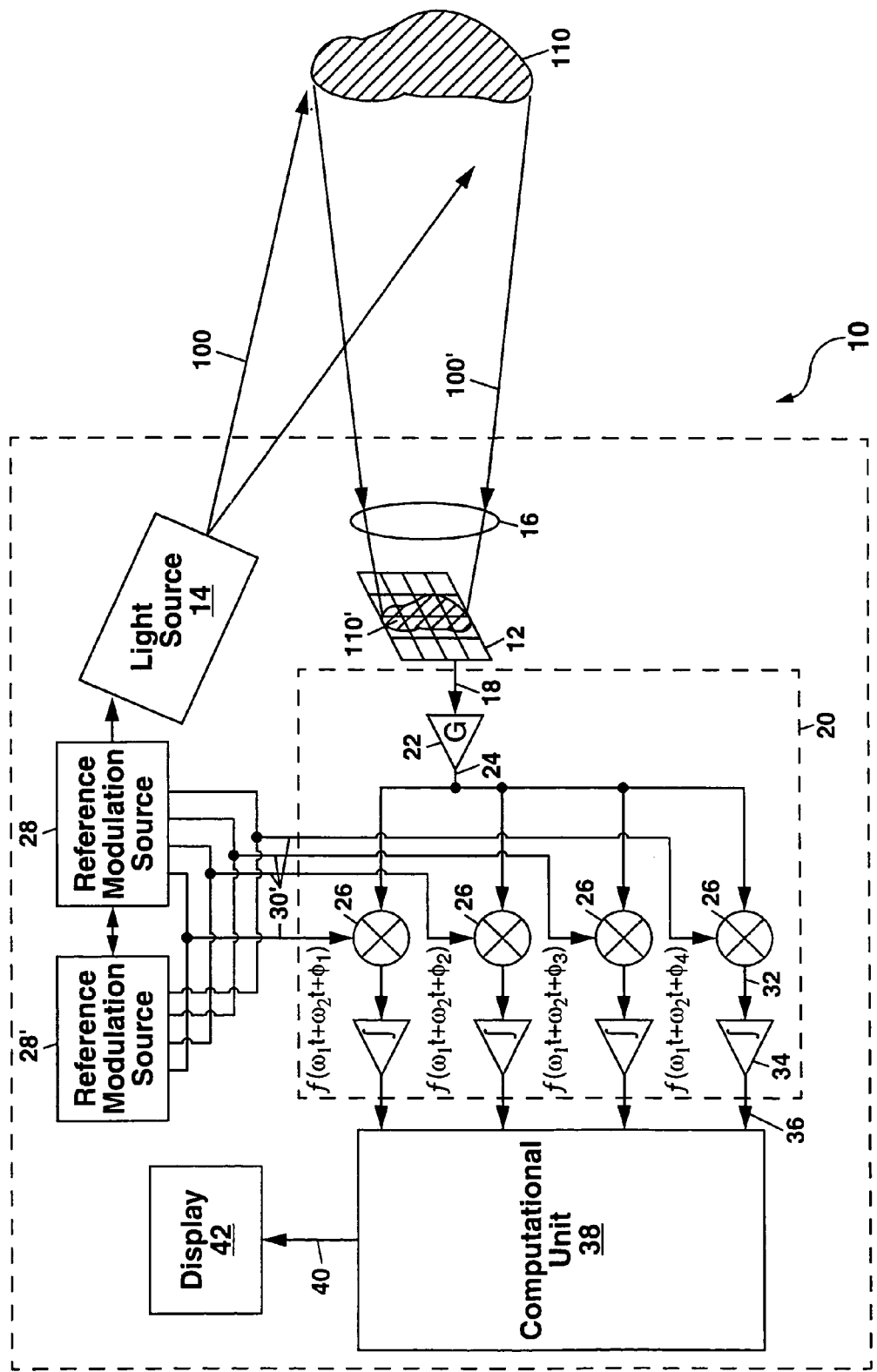
FIG. 4 shows a schematic diagram of another embodiment of the apparatus of the present invention which includes two reference modulation sources operating at different frequencies to provide an absolute measurement of range for generating a 3-D image of a scene of interest.

FIG. 4 schematically illustrates another embodiment of the apparatus 10 of the present invention which includes two reference modulation sources 28 and 28' (or alternately a single reference modulation source 28 providing multiple ac reference signals 30) to provide an absolute measurement of range for generating a 3-D image of a scene of interest 110. One of the reference modulation sources 28 provides an ac reference signal given by a periodic function $f(\omega_1 t + \phi_n)$ with $\omega_1 = 2\pi f_{m1}$ where $f_{m1}$ is a relatively high frequency of modulation (e.g. $\geq 1$ MHz) expressed in Hertz and with a phase delay $\phi_n$ which is different for each modulator 26 driven by the reference modulation source 26 (e.g. 0°, 90°, 180° and 270°). The other reference modulation source 28' preferably provides an ac reference signal given by a periodic function $f(\omega_2 t + \phi_n)$ with $\omega_2 = 2\pi f_{m2}$ where $f_{m2}$ is a relatively low frequency of modulation (e.g. $\ll 1$ MHz) selected so that an estimated depth of field R' about the scene of interest 110, upon gating of the modulators 26 or photodetectors 12, is located within one period of the frequency $f_{m2}$:

$$R' < \frac{c}{2 f_{m2}}$$

The relatively low frequency of modulation $f_{m2}$ can be a submultiple of the relatively high frequency of modulation $f_{m1}$.

In FIG. 4, the ac reference signals from the two reference modulation sources 28 and 28' are added together to form a combined (i.e. mixed) ac reference signal 30' given by $f(\omega_1 t + \omega_2 t + \phi_n)$ which can be provided to each modulator 26. The light source 14 can be pulsed or otherwise modulated to include a substantial component at the reference modulation frequencies $\omega_1$ and $\omega_2$. The integrator output signals 36 from each modulator 34 can then be digitized in the computational unit 38 as previously described and then fitted to an equation of the form:

$$A_1 + A_2 f(\omega_1 t + \phi_A) + k A_2 f(\omega_2 t + \phi_B)$$

to solve for the four unknowns $A_1$, $A_2$, $\phi_A$ and $\phi_B$ where k is a predetermined constant. In this equation above, $A_1$ is due to variances in ambient light received by each photodetector 12, $A_2$ is representative of the intensity of the light 100' at each frequency $f_{m1}$ and $f_{m2}$ received by each photodetector, and $\phi_A$ and $\phi_B$ are phase shifts for the reflected or scattered light 100'. Where the ambient light is small or known, the number of modulators 26 can potentially be reduced by one.

In the above equation, the phase shift $\phi_B$ can be used to determine an ambiguity interval which is defined herein as an integer multiple of a high frequency ambiguity interval R'' where:

$$R'' = \frac{c}{2f_{m1}}$$

wherein the scene of interest 110 is located; and the phase shift $\phi_A$ can be used to determine the precise location within R'' wherein a portion of the 3-D image is located for the light 100' detected by each photodetector 12.

In other embodiments of the present invention, the modulators can be driven at unique frequencies, $\omega_1, \omega_2 \ldots \omega_n$ so that the ac reference signal 30 for each modulator 26 includes only a single frequency [e.g. $f(\omega_1 t+\phi_1)$, $f(\omega_1 t+\phi_2)$ $f(\omega_1 t+\phi_3)$, $f(\omega_1 t+\phi_4) \ldots f(\omega_n t+\phi_{n+2})$] using a total of n+2 modulators 26. In general, when an integer number n of frequencies $\omega_1, \omega_2 \ldots \omega_n$ are used, the number of modulators will be n+2 or larger.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An apparatus for generating a three-dimensional (3-D) image of a scene illuminated by a light source, comprising:
   (a) a two-dimensional (2-D) array of photodetectors for receiving reflected or scattered light from the scene illuminated by the light source with the light being imaged onto the 2-D array of photodetectors, and with each photodetector in the 2-D array generating therefrom an electrical output signal;
   (b) a plurality of modulators associated with each photodetector in the 2-D array, each modulator receiving the electrical output signal from that photodetector and an alternating current (ac) reference signal with a different phase delay for each modulator, and generating a modulated output signal from each modulator associated with that photodetector;
   (c) a plurality of integrators associated with each photodetector, each integrator receiving the modulated output signal from one of the plurality of modulators, and generating therefrom an integrator output signal for each integrator associated with that photodetector; and
   (d) a computational unit receiving each integrator output signal associated with each photodetector and generating therefrom intensity and range information about the scene illuminated by the light source to generate the 3-D image of the scene.

2. The apparatus of claim 1 further including an optical element located proximate to the 2-D array of photodetectors to image the reflected or scattered light thereon.

3. The apparatus of claim 1 wherein the 3-D image of the scene is generated in response to a single pulse of light from the light source.

4. The apparatus of claim 1 wherein the light source comprises a laser or a light-emitting diode.

5. The apparatus of claim 1 wherein the 2-D array of photodetectors is located on a first substrate, and the plurality of modulators is located on a second substrate.

6. The apparatus of claim 5 wherein the first and second substrates are superposed one above the other and electrically connected together.

7. The apparatus of claim 6 wherein the first and second substrates are electrically connected together by a plurality of solder bump bonds.

8. The apparatus of claim 1 wherein each photodetector comprises a silicon photodetector.

9. The apparatus of claim 1 wherein each photodetector comprises an indium gallium arsenide (InGaAs) photodetector.

10. The apparatus of claim 1 wherein each photodetector comprises a mercury cadmium telluride (HgCdTe) photodetector.

11. The apparatus of claim 1 wherein the electrical output signal from each photodetector is filtered or amplified or both prior to being provided to each modulator associated with that photodetector.

12. The apparatus of claim 1 wherein the phase delay for each modulator associated with one of the photodetectors comprises an integer fraction of a period of the ac reference signal.

13. The apparatus of claim 1 wherein the phase delay for one of the plurality of modulators associated with each photodetector is 0 degrees, and the phase delay for the remainder of the plurality of modulators associated with that photodetector comprises an integer multiple of 360/n degrees where n is a total number of modulators associated with that photodetector.

14. The apparatus of claim 1 wherein the plurality of integrators associated with each photodetector in the 2-D array comprises three integrators.

15. The apparatus of claim 14 wherein the phase delay for a first integrator of the three integrators is 0 degrees, the phase delay for a second integrator of the three integrators is 120 degrees, and the phase delay for a third integrator of the three integrators is 240 degrees.

16. A method for generating a three-dimensional (3-D) image information from a scene illuminated by a light source, comprising steps for:
   (a) detecting reflected or scattered light from the scene illuminated by the light source with a two-dimensional (2-D) array of photodetectors and generating an electrical output signal from each photodetector;
   (b) simultaneously modulating the electrical output signal from each photodetector by a plurality of modulators operating at the same reference frequency, but with a different phase delay for each modulator, and thereby generating a plurality of modulated output signals for each photodetector; and
   (c) separately integrating each of the plurality of modulated output signals for each photodetector and producing therefrom a plurality of integrator output signals wherefrom intensity and range information for each photodetector can be determined.

17. The method of claim 16 further comprising a step for imaging the reflected or scattered light from the scene onto the 2-D array of photodetectors with an optical element.

18. The method of claim 16 wherein the step for detecting the reflected or scattered light from the scene comprises detecting the reflected or scattered light from a single pulse of light from the light source.

19. The method of claim 16 wherein the light source comprises a laser or a light-emitting diode.

20. The method of claim 16 wherein the step for generating the electrical output signal from each photodetector comprises transforming a photocurrent signal generated by the photodetector in response to detected light into a voltage signal.

21. The method of claim 20 wherein the step for generating the electrical output signal from each photodetector further comprises amplifying or filtering the photocurrent signal or the voltage signal.

22. The method of claim 16 wherein the phase delay for each modulator comprises an integer fraction of a period of the reference frequency, or a multiple thereof.

23. A three-dimensional (3-D) imaging camera for generating a 3-D image of a scene illuminated by a single pulse of light from a source, comprising:
 (a) a two-dimensional (2-D) array of photodetectors, with each photodetector in the array receiving reflected or scattered light from the illuminated scene and generating therefrom a photodetector output signal;
 (b) at least two modulators receiving the photodetector output signal from each photodetector and generating a modulator output signal which is a product of the photodetector output signal and an alternating current (ac) reference signal, with the ac reference signal for each modulator having the same frequency and a different phase delay;
 (c) an integrator connected to receive the modulator output signal from each modulator and to generate therefrom an integrator output signal by integrating the modulator output signal over time; and
 (d) a computational unit for receiving each integrator output signal and generating therefrom the 3-D image of the scene.

24. The 3-D imaging camera of claim 23 wherein the light source comprises a laser or a light-emitting diode.

25. The 3-D imaging camera of claim 23 further comprising an optical element for imaging the reflected or scattered light from the illuminated scene onto the 2-D array of photodetectors.

26. The 3-D imaging camera of claim 23 wherein the phase delay for one of the modulators is 0 degrees, and the phase delay for the remaining modulators is equal to an integer multiple of 360/n degrees where n is a total number of the modulators associated with each photodetector.

* * * * *